July 30, 1957 P. P. KUBIK ET AL 2,801,123
KNOB RETAINER FOR TUBULAR LOCK
Filed Feb. 18, 1953 2 Sheets-Sheet 2
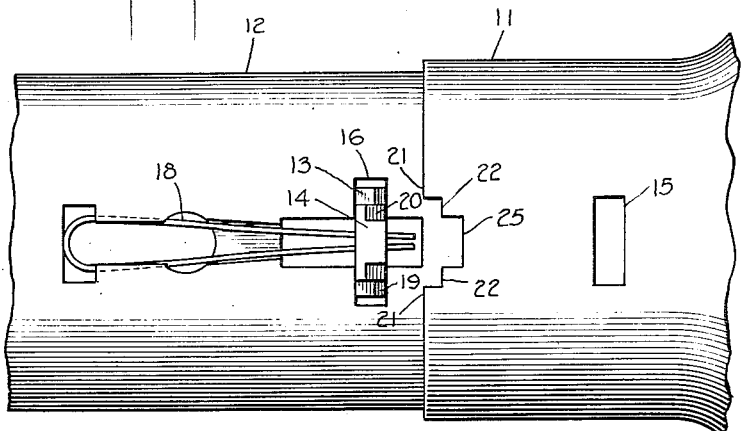
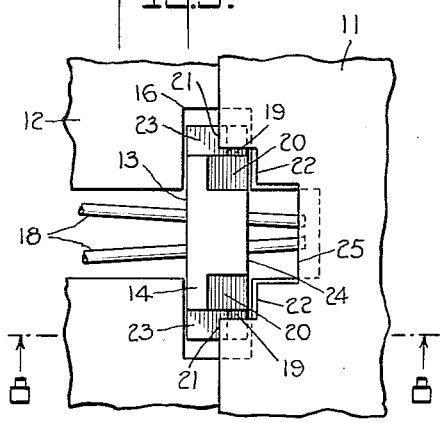
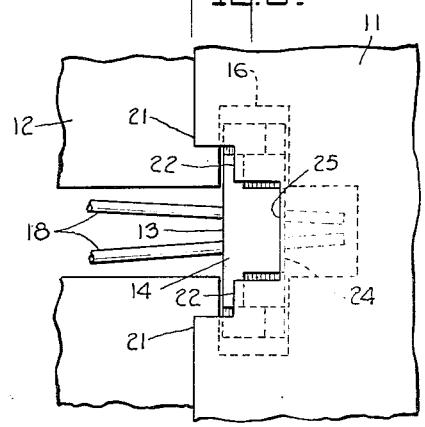
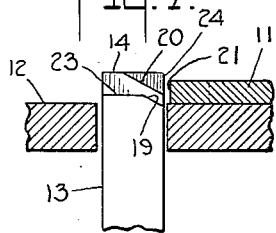
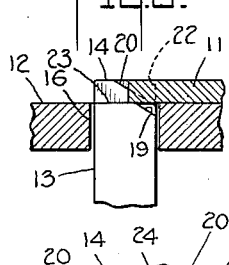
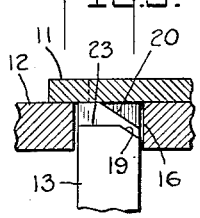
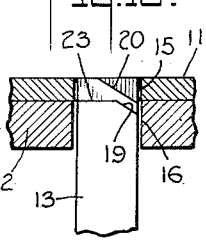
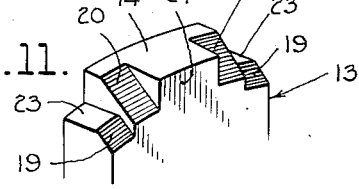
INVENTOR
Raymond W. Schmid
Paul P. Kubik
BY
A. H. Golden
ATTORNEY

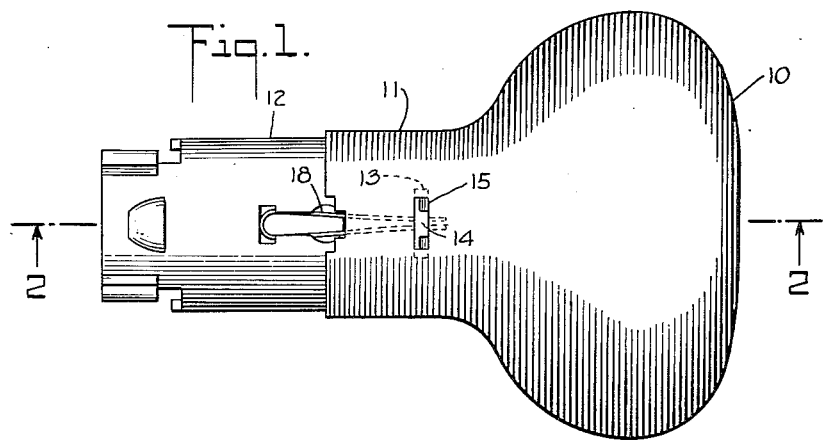
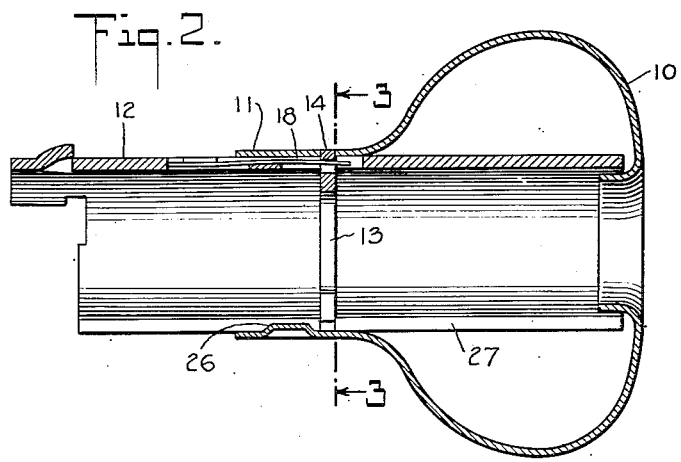
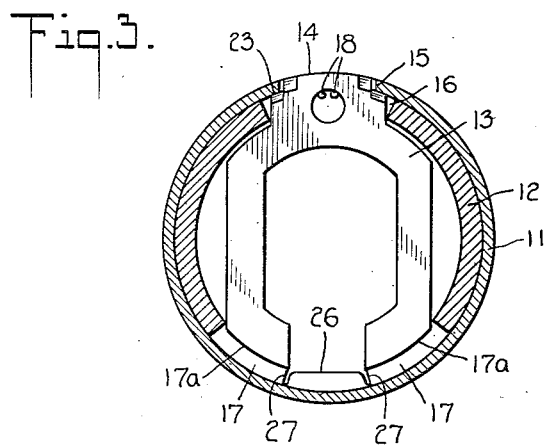

United States Patent Office 2,801,123
Patented July 30, 1957

2,801,123
KNOB RETAINER FOR TUBULAR LOCK

Paul P. Kubik, Germantown, and Raymond W. Schmid, Philadelphia, Pa., assignors to The Yale & Towne Manufacturing Company, Stamford, Conn., a corporation of Connecticut Application February 18, 1953, Serial No. 337,476

10 Claims. (Cl. 292—352)

This invention relates to means for retaining a knob on a tubular lock, and more particularly to means allowing the easy assembly of a knob to a tubular lock.

The knob in locks of the particular class is assembled on a spindle sleeve, and a dog on this sleeve is spring pressed to engage in an opening in a sleeve portion of the knob, thereby retaining the knob relatively to the spindle sleeve. The dog as constructed in the prior art, in order to function effectively to hold the knob in place, and to limit its movement, must be depressed before the knob can move to assembled position. We contribute, by our invention, a novel construction that enables us to assemble the knob to the spindle sleeve merely by a simple movement of the knob onto the sleeve, while yet allowing the dog to function effectively as a knob retainer.

As a very important part of our invention, we arrange a novel cam action between the sleeve portion of the knob and the projecting part of the dog. Through this action, the knob depresses the dog when moving toward assembled position, thereby allowing the knob to continue its movement to fully assembled position on the spindle sleeve. This we accomplish while utilizing a very thin sectioned sleeve portion on the knob, and a dog that does not extend substantially outwardly of the sleeve portion when holding the knob assembled to the spindle sleeve. More particularly, we prefer to form cam means on the dog, the knob coacting with this cam means merely through an edge part of the sleeve portion. In this arrangement, the sleeve portion has preferably no inclined cam surfaces, and may also have its usual thin-sectioned form if that is preferred.

As a further feature of our invention, the knob-retaining dog holds the knob against inward movement beyond its assembled position on the spindle sleeve. To do this, the dog has a non-camming relation to the knob when the knob is assembled to the sleeve. In detail, when the dog enters the opening in the sleeve portion of the knob, a flat surface thereon holds the knob against movement past assembled position. This flat surface is so positioned as to permit a part of the sleeve portion of the knob to coact with the cam means on the dog as the knob moves toward assembled position, and for this purpose we form on the sleeve portion of the knob a slot through which the projecting part of the dog extends freely as the sleeve portion contacts the dog.

As another feature of our invention, we cam our dog to depressed position in multiple steps. In detail, we utilize upon the projecting part of the dog multiple cam surfaces that are rather short and are arranged to yield a relatively large depressing movement of the dog. In more detail, we form first and second cam steps in laterally disposed relation upon the dog. When moving axially upon the spindle sleeve toward assembled position, the sleeve portion of the knob engages the first cam step and depresses the dog a predetermined distance as it moves over this step. During this time, the second cam step is moving in a slot in the edge of the sleeve portion, and when the first cam step has completed its action, the sleeve portion engages the second step to move the dog to completely depressed position. This stepped arrangement of the cam means enables us to utilize cam surfaces of relatively slight inclination that depress the dog easily even though the end part of the dog is quite small and can not offer a single cam surface of any considerable length.

As still another feature of our invention, we provide a novel arrangement whereby the dog occupies a precise position relatively to the sleeve portion of the knob when engaged in the opening in the sleeve portion. Because of this precise position of the dog, we are able to obtain a reliable dogging engagement between the dog and the relatively thin material of the sleeve portion, and at the same time to hold the end of the dog flush with the outer surface of the sleeve portion. To accomplish this, we prefer to utilize shoulders on the dog, these shoulders engaging directly against the inner surface of the sleeve portion of the knob.

We have thus outlined rather broadly the more important features of our invention in order that the detailed description thereof that follows may be better understood, and in order that our contribution to the art may be better appreciated. There are, of course, additional features of our invention that will be described hereinafter, and which will form the subject of the claims appended hereto. Those skilled in the art will appreciate that the conception on which our disclosure is based may readily be utilized as a basis for the designing of other structures for carrying out the several purposes of our invention. It is important, therefore, that the claims be regarded as including such equivalent constructions as do not depart from the spirit and scope of our invention, in order to prevent the appropriation of our invention by those skilled in the art.

Referring now to the drawings:

Fig. 1 shows a preferred form of our novel knob retaining construction.

Fig. 2 is a longitudinal section taken on the line 2—2 of Fig. 1.

Fig. 3 is a cross-section taken on the line 3—3 of Fig. 2.

Fig. 4 is similar to a portion of Fig. 1, but shows the sleeve portion of the knob in a position away from the dog.

Figs. 5 and 6 show different stages in the movements of the dog and the sleeve portion of the knob as the knob moves to assembled position.

Figs. 7, 8, 9 and 10 illustrate the movements of the dog occurring as the knob moves to fully assembled position.

Fig. 11 is a perspective view showing in detail the end part of the dog.

To illustrate our invention, we show in the drawings a knob 10 having a sleeve portion 11 that slides axially to assembled position on a spindle sleeve 12. To retain the knob 10 in assembled position, a dog 13 on the spindle sleeve 12 is pressed radially outward by spring action so that an end part 14 of the dog projects into an opening 15 in the sleeve portion 11, this being a usual arrangement in locks of the particular class. In the particular spindle sleeve that we have chosen to illustrate, the dog 13 is mounted for sliding movement in slots 16, 17, as shown in Fig. 3, and is pressed outwardly by a spring 18 engaging in an opening in the dog, but the specific details of the means for mounting and pressing the dog are not important to an understanding of our invention.

In the novel construction that we have now conceived in a lock of this class, we provide an exceedingly novel cam action between the dog 13 and the sleeve portion 11 of the knob. To obtain this action in the preferred form of our invention, we form upon the end part 14 of the dog 13 a pair of relatively low inclined cam steps 19 and a pair of relatively high inclined cam steps 20. As may be seen most clearly in Fig. 11, the cam steps 19 are formed adjacent to opposed edges of the dog 13, and the steps 20 are disposed inwardly from the steps 19. It is within the scope of our invention to use only one low step and one high step, but we do prefer to form the steps 19, 20 in pairs that are symmetrically placed in order to obtain a balanced action upon the dog 13.

For reasons that will appear later, the end part 14 when out of engagement with the sleeve portion 11, as in Fig. 7, is pressed outwardly by the spring 18 farther than is necessary to coact with this sleeve portion. The low cam steps 19 are then in position to be engaged by edge parts 21 of the sleeve portion 11 as the knob moves toward assembled position. As the knob 10 continues to move toward assembled position, the edge parts 21 first act upon the low steps 19 to depress the dog a certain distance, and then pass the steps 19, as in Figs. 5 and 8. Next, edge parts 22 that are set inwardly from the edge parts 21 on the sleeve portion 11 engage the high cam steps 20 and depress the dog 13 completely within the sleeve portion 11, as in Fig. 9. When the knob 10 reaches assembled position, the opening 15 is aligned with the dog 13, and the action of the spring 18 then causes the end part 14 to enter the opening 15 in the position shown in Figs. 1, 2, 3 and 10. Theoretically, of course, it would be possible to depress the dog 13 by the use of a single inclined cam surface on the dog, but by our novel stepped cam arrangement we avoid steep cam surfaces that would hinder the movement of the knob to assembled position, and we are able also to extend the camming action through a distance that is much greater than the thickness of the dog.

It should be observed at this point that the outward movement of the dog 13 when engaged in the opening 15 is limited by shoulders 23 that engage the inner surface of the sleeve portion 11, as best seen in Fig. 3, these shoulders 23 preferably being formed as parts of the low cam steps 19. Referring again to Fig. 7, it will be seen that the shoulders 23 when unrestrained move outwardly beyond the surface of the spindle sleeve 12, and therefore these shoulders when restrained by the sleeve portion 11, as in Figs. 3 and 10, serve to hold the dog 13 in a precise position relatively to the opening 15. Because the dog 13 is held in this precise position, we are able to form the end part 14 of the dog to be flush with the outer surface of the sleeve portion 11, while the end part 14 is fully engaged in the opening 15 with the relatively thin material of the sleeve portion 11 to dog the knob 10 securely in assembled position. To prevent the dog 13 from being depressed so far as to move the shoulders 23 completely within the spindle sleeve 12, we form the opposed end 17a of the dog 13 to limit depressing movement of the dog by engagement with the inner surface of the sleeve portion 11. Thus, when the dog is depressed, the shoulders 23 are held in the slot 16 and can not by tilting of the dog 13 engage accidentally the inner surface of the spindle sleeve 12 to prevent outward movement of the dog.

We have described the camming action whereby the movement of the knob 10 to assembled position depresses the dog 13, but we contribute also means whereby the knob when in assembled position is ineffective to depress the dog and therefore can not move past assembled position. We accomplish this by constructing the dog 13 in a particular way to hold the sleeve portion 11 away from the cam surfaces 19, 20 when the dog is engaged in the opening 15. Thus, we provide upon the front face of the dog 13 a flat detent surface 24 that extends to the outer end of the dog between the high cam steps 20. The detent surface 24 holds the sleeve portion 11 against movement past assembled position, and makes it ineffective to depress the dog 13. To permit the edge parts 21, 22 to depress the dog 13 as the knob 10 moves toward assembled position on the spindle sleeve 12, we form between the parts 22 a relatively long slot 25 that allows the sleeve portion 11 to move freely relatively to the detent surface 24.

Through the novel construction that we contribute by our invention, it is an exceedingly simple matter to assemble the knob to the spindle sleeve because the movements of the dog are entirely automatic as the knob is pushed to assembled position. It is possible, in fact, to arrange a part of the lock to conceal the dog because the dog requires no manipulation in the operation of assembling the knob to the lock. We prefer to facilitate the assembly of the knob still further through means that guides the knob so that the opening 15 in the sleeve portion of the knob moves into the proper aligned relation to the dog 13. Thus, we show on the sleeve portion 11 a lug 26 that moves in a longitudinal slot 27 in the spindle sleeve 12, this arrangement holding the opening 15 against rotation away from aligned relation to the dog 13.

We believe that the construction of our novel knob retaining means will now be understood, and that its operation and advantages will be fully appreciated by those skilled in the art.

We now claim:

1. In a lock of the class described, a longitudinally extending hollow spindle sleeve, a knob having a longitudinally extending thin sleeve portion slidable to an assembled position on said spindle sleeve, a dog on said spindle sleeve, a spring pressing said dog to a position projecting from said spindle sleeve, detent surfaces on the projecting part of said dog for engaging in an opening in said sleeve portion to lock said knob in assembled position relatively to the spindle sleeve, cam means formed on the projecting part of said dog in inclined relation to the spindle sleeve axis, and the end of the knob sleeve portion having a notch effecting clearance between the sleeve portion and the detent surfaces on the dog as the sleeve portion moves toward assembled position whereby to allow the sleeve portion to depress the dog through said cam means.

2. In a lock of the class described, a spindle sleeve, a knob having a sleeve portion slidable to an assembled position on said spindle sleeve, a yielding dog on said spindle sleeve having an end part projecting from said spindle sleeve, first and second cam steps on the end part of said dog, edge parts of said sleeve portion coacting successively with said first and second cam steps to depress said dog as said sleeve portion slides on said spindle sleeve whereby to alow said knob to move to assembled position, and the sleeve portion of said knob having an opening into which the end part of said yielding dog moves when said knob is in assembled position whereby to secure said knob relatively to said spindle sleeve.

3. In a lock of the class described, a spindle sleeve, a knob having a sleeve portion slidable to an assembled position on said spindle sleeve, a yielding dog on said spindle sleeve having an end part projecting from said spindle sleeve whereby to enter an opening in said sleeve portion when said knob is in assembled position, first and second cam steps on the end part of said dog, edge parts of said sleeve portion coacting successively with said first and second cam steps to depress said dog as said sleeve portion slides on said spindle sleeve whereby to allow said knob to move to assembled position, and surfaces on the end part of said dog holding said knob in assembled position on said spindle sleeve when said end part enters the opening in said sleeve portion.

4. In a lock of the class described, a spindle sleeve, a knob having a sleeve portion slidable to an assembled position on said spindle sleeve, a yielding dog on said spindle sleeve having an end part projecting from said spindle sleeve, first and second cam steps on the end of said dog, edge parts of said sleeve portion coacting successively with said first and second cam steps to depress said dog as said sleeve portion slides on said spindle sleeve whereby to allow said knob to move to assembled position, the sleeve portion of said knob having an opening into which the end part of said dog moves when said knob is in assembled position whereby to secure said knob relatively to said spindle sleeve, and a surface on the end part of said dog for engaging the inner surface of said sleeve portion when said end part is in said opening to hold said end part against movement outwardly beyond the outer surface of said sleeve portion.

5. In a lock of the class described, a spindle sleeve, a knob having a sleeve portion slidable to an assembled position on said spindle sleeve, a dog mounted to slide laterally on said spindle sleeve having yielding means pressing said dog toward position in which an end part of the dog projects from said spindle sleeve, said sleeve portion having an opening into which said end part moves when said knob is in assembled position to secure said knob relatively to said spindle sleeve, a first cam step on the end part of said dog, an edge part of said sleeve portion coacting with said first cam step to depress said dog partially within said sleeve portion as said sleeve portion moves toward assembled position on said spindle sleeve, a second cam step on the end part of said dog, and a second edge part of said sleeve portion for coacting with said second cam step to depress said dog further to a position completely within said sleeve portion to allow said knob to move to assembled position.

6. In a lock of the class described, a spindle sleeve, a knob having a sleeve portion slidable to an assembled position on said spindle sleeve, a yielding dog on said spindle sleeve having an end part projecting laterally from said spindle sleeve, the sleeve portion of said knob having an opening into which said end part moves when said knob is in assembled position, a cam step on the end part of said dog, an edge part of said sleeve portion coacting with said cam step to depress said dog within said sleeve portion as said sleeve portion slides toward assembled position on said spindle sleeve, and surfaces on the end part of said dog coacting with the sleeve portion of said knob when said end part is in said opening to hold said knob against movement out of assembled position relatively to said spindle sleeve.

7. In a lock of the class described, a longitudinally extending hollow spindle sleeve, a knob having a longitudinally extending thin sleeve with an end edge part slidable to an assembled position on said spindle sleeve, a yielding dog on said spindle sleeve, a detent portion on said dog normally projecting from the surface of the spindle sleeve whereby said detent portion is in opposed relation to said end part of the thin knob sleeve as said sleeve slides toward assembled position, said detent portion moving out of opposed relation to said end part of the knob sleeve when the dog is depressed whereby to enable the knob sleeve to move over the detent portion to assembled position, said thin knob sleeve having an opening into which said detent portion of the yielding dog moves when the knob sleeve is in assembled position whereby to lock the knob sleeve to the spindle sleeve, said knob sleeve further formed with a notch in its end part effecting clearance between said sleeve and said detent portion of the dog in advance of the movement of the sleeve over the detent portion, and cooperative surfaces on said yelding dog and on the end part of the thin knob sleeve whereby said sleeve when moving toward assembled position depresses the dog while having clearance relatively to the detent portion of the dog.

8. In a lock of the class described, a longitudinally extending hollow spindle sleeve, a knob having a longitudinally extending thin sleeve portion slidable to an assembled position on said spindle sleeve, a yielding dog on said spindle sleeve having an end part projecting outwardly from said spindle sleeve, surfaces on said thin sleeve portion and dog coacting to depress said end part of the dog as said sleeve portion slides on said spindle sleeve to allow said knob to move to assembled position, said thin sleeve portion of said knob having on one side thereof an opening into which said yielding dog moves said end part when the knob moves to assembled position, opposed surfaces on said opening coacting with the end part of the dog when that part is in the opening whereby to lock said knob in assembled position relatively to the spindle sleeve, and a further surface on said dog limiting by engagement with an inner surface of said side of the sleeve portion of the knob the movement of said end part of the dog into said opening to hold said end part substantially flush with the outer surface of said sleeve portion.

9. In a lock of the class described, a longitudinally extending hollow spindle sleeve, a knob having a longitudinally extending thin sleeve portion slidable to an assembled position on said spindle sleeve, a yielding dog moving vertically in said spindle sleeve between projecting and depressed positions relatively to said spindle sleeve, surfaces on said thin sleeve portion and dog coacting to depress said dog as said sleeve portion slides on said spindle sleeve to allow said knob to move to assembled position on the spindle sleeve, said sleeve portion of the knob having on one side thereof an opening into which said dog moves when the knob moves to assembled position, opposed surfaces on said opening on the side of the sleeve portion coacting with surfaces on the dog when the dog is in said opening whereby to secure said knob in assembled position, a portion of said dog limiting by engagement with an inner surface of said side of the sleeve portion of the knob the projecting movement of said dog in said opening, and means limiting movement of said dog inwardly of said hollow spindle sleeve when depressed whereby to prevent said dog from being held in depressed position by engagement of said portion of the dog with the inner surface of said hollow spindle sleeve.

10. In a lock of the class described, a longitudinally extending hollow spindle sleeve, a knob having a longitudinally extending thin sleeve with an end part slidable to an assembled position on said spindle sleeve, a yielding dog on said spindle sleeve, a detent portion on said dog normally projecting from the surface of the spindle sleeve whereby said detent portion is in opposed relation to the said end part of the thin knob sleeve as said sleeve slides toward assembled position, said detent portion on the dog moving out of opposed relation to said end part of the knob sleeve when the dog is depressed whereby to enable the knob sleeve to move over the detent portion to assembled position, said thin knob sleeve having on one side thereof an opening into which said detent portion of the yielding dog moves when the knob sleeve is in assembled position, opposed surfaces on said opening coacting with the surfaces of the detent portion of the dog for holding said knob against sliding inwardly and outwardly of the spindle sleeve when the detent is in said opening whereby to lock the knob sleeve to the spindle sleeve, cam means on said yielding dog, an edge portion on said end part of the thin knob sleeve formed to act against the cam means on the dog in advance of the movement of the end part of the knob sleeve over the detent portion of the dog, and said edge portion by so acting against the cam means on the dog depressing the dog as the knob sleeve slides toward assembled position.

References Cited in the file of this patent

UNITED STATES PATENTS

| | | |
|---|---|---|
| 427,073 | Gray | May 6, 1890 |
| 1,006,427 | Boraks | Oct. 17, 1911 |
| 2,059,319 | De Vries | Nov. 3, 1936 |
| 2,062,765 | Schlage | Dec. 1, 1936 |
| 2,538,688 | Heyer | Jan. 16, 1951 |

FOREIGN PATENTS

| | | |
|---|---|---|
| 480,317 | Canada | Jan. 15, 1952 |